United States Patent
Kong et al.

(10) Patent No.: US 11,424,864 B2
(45) Date of Patent: Aug. 23, 2022

(54) DATA PACKET RETRANSMISSION METHOD AND APPARATUS

(71) Applicant: Huawei Technologies Co., Ltd., Shenzhen (CN)

(72) Inventors: Xiangzhen Kong, Shanghai (CN); Chao Qin, Shanghai (CN); Zhiyong Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 17/127,536

(22) Filed: Dec. 18, 2020

(65) Prior Publication Data
US 2021/0105093 A1 Apr. 8, 2021

Related U.S. Application Data

(63) Continuation of application No. PCT/CN2018/092009, filed on Jun. 20, 2018.

(51) Int. Cl.
*H04L 1/08* (2006.01)
*H04L 5/00* (2006.01)
(Continued)

(52) U.S. Cl.
CPC .............. *H04L 1/08* (2013.01); *H04L 5/0055* (2013.01); *H04L 41/0677* (2013.01);
(Continued)

(58) Field of Classification Search
CPC ....... H04L 1/08; H04L 1/0803; H04L 5/0053; H04L 5/0055; H04L 69/00; H04L 69/322;
(Continued)

(56) References Cited

U.S. PATENT DOCUMENTS

| 7,509,554 B2 * | 3/2009 | Lohr ..................... H04L 1/1845 714/751 |
| 7,657,815 B2 * | 2/2010 | Seidel ................... H04L 1/1845 714/748 |

(Continued)

FOREIGN PATENT DOCUMENTS

| CN | 1411244 A | 4/2003 |
| CN | 1719762 A | 1/2006 |

(Continued)

OTHER PUBLICATIONS

Zhao Guohui et al., "Research on RLC Data Retransmit in LTE Radio Protocol Stack," Video Engineering , vol. 35, No. 1, total 4 pages (2011). With English abstract.

(Continued)

*Primary Examiner* — Warner Wong
(74) *Attorney, Agent, or Firm* — Leydig, Voit & Mayer, Ltd.

(57) ABSTRACT

Data packet retransmission by a radio link control (RLC) protocol entity of a transmit end is described herein. The retransmission includes sending a target sequence number and a first data packet to a MAC entity of the transmit end and recording a quantity of times the target sequence number is transmitted to the MAC entity of the transmit end at an RLC layer. In accordance with receiving the target sequence number and a negative acknowledgement that are sent by the MAC entity, obtaining the RLC layer transmission count corresponding to the target sequence number. In accordance with determining the RLC layer transmission count is less than an RLC layer transmission threshold, sending a retransmission instruction based on the first data packet to the MAC entity. In accordance with a retransmission condition at the RLC layer being met, the RLC entity of the transmit end triggers retransmission at the RLC layer.

20 Claims, 4 Drawing Sheets

(51) Int. Cl.
*H04L 41/0677* (2022.01)
*H04L 69/324* (2022.01)
*H04M 7/00* (2006.01)
*H04L 65/10* (2022.01)
*H04L 1/18* (2006.01)

(52) U.S. Cl.
CPC .......... *H04L 69/324* (2013.01); *H04L 1/1864* (2013.01); *H04L 1/1896* (2013.01); *H04L 65/10* (2013.01); *H04M 7/006* (2013.01)

(58) Field of Classification Search
CPC ..... H04L 69/324; H04L 69/325; H04L 41/06; H04L 41/0677; H04L 1/00; H04L 1/18; H04L 1/1812; H04L 1/1819; H04L 1/1825; H04L 1/1864; H04L 1/1896; H04L 69/40; H04L 12/1868; H04L 51/30; H04L 65/10; H04M 7/006; H04M 7/0066; H04W 40/125; H04W 4/20; H04W 80/00
See application file for complete search history.

(56) References Cited

U.S. PATENT DOCUMENTS

| | | | | |
|---|---|---|---|---|
| 8,050,228 B2* | 11/2011 | Umesh | ................... | H04L 1/187 |
| | | | | 370/341 |
| 8,169,905 B2* | 5/2012 | Umesh | ................. | H04L 1/1848 |
| | | | | 370/231 |
| 8,275,565 B2* | 9/2012 | Umesh | ................. | H04L 1/1671 |
| | | | | 702/89 |
| 8,839,064 B2* | 9/2014 | Kim | ..................... | H04L 1/1867 |
| | | | | 714/748 |
| 2002/0001296 A1* | 1/2002 | Lee | ...................... | H04L 1/0069 |
| | | | | 370/469 |
| 2002/0021698 A1* | 2/2002 | Lee | ...................... | H04L 1/1819 |
| | | | | 370/469 |
| 2002/0172208 A1* | 11/2002 | Malkamaki | ........... | H04L 1/1822 |
| | | | | 370/428 |
| 2009/0172490 A1* | 7/2009 | Shinohara | ............. | H04L 1/1838 |
| | | | | 714/748 |
| 2010/0257423 A1 | 10/2010 | Kim | | |
| 2010/0278105 A1 | 11/2010 | Diachina et al. | | |
| 2010/0296431 A1* | 11/2010 | Terry | ................... | H04L 1/1812 |
| | | | | 370/315 |
| 2011/0170491 A1* | 7/2011 | Shinohara | ............. | H04W 28/10 |
| | | | | 370/328 |
| 2012/0163304 A1 | 6/2012 | Chun et al. | | |
| 2016/0286402 A1 | 9/2016 | Hsu et al. | | |
| 2018/0132279 A1* | 5/2018 | Yi | ......................... | H04W 72/04 |
| 2018/0343583 A1* | 11/2018 | Shan | .................... | H04W 24/10 |

FOREIGN PATENT DOCUMENTS

| | | |
|---|---|---|
| CN | 101615990 A | 12/2009 |
| CN | 102347827 A | 2/2012 |
| CN | 102611537 A | 7/2012 |
| CN | 102843227 A | 12/2012 |
| CN | 103095428 A | 5/2013 |
| CN | 104836648 A | 8/2015 |
| CN | 105871519 A | 8/2016 |
| CN | 105934907 A | 9/2016 |
| CN | 106549736 A | 3/2017 |
| CN | 107612664 A | 1/2018 |
| WO | 2011015071 A1 | 2/2011 |
| WO | 2017117800 A1 | 7/2017 |

OTHER PUBLICATIONS

Dang Ying et al., "A Link Layer Retransmission Scheme for Improving TCP Performance," IT Age, total 3 pages (2007). With English abstract.

* cited by examiner

DATA PACKET RETRANSMISSION METHOD AND APPARATUS

CROSS-REFERENCE TO RELATED APPLICATIONS

This application is a continuation of International Application No. PCT/CN2018/092009, filed on Jun. 20, 2018, the disclosure of which is hereby incorporated by reference in its entirety.

TECHNICAL FIELD

Embodiments of this application relate to the field of communications technologies, and more specifically, to a data packet retransmission method and apparatus.

BACKGROUND

With large-scale commercial use of a long term evolution (LTE) network, voice quality of voice over internet protocol (VOIP) also attracts more and more attention of users, and it is of great significance to improve call quality of voice transmission.

Currently, a voice data packet is generally transmitted in an unacknowledged mode (UM) at a radio link control (RLC) protocol layer. In a process in which the voice data packet is transmitted in the unacknowledged mode at the RLC layer, if a packet loss occurs at a medium access control (MAC) layer, a hybrid automatic repeat request (HARQ) is triggered at the MAC layer. When a quantity of retransmissions reaches a maximum quantity of hybrid automatic repeat requests, the voice data packet is discarded at the MAC layer.

The transmission of the voice data packet completely depends on transmission reliability of the MAC layer. If the transmission at the MAC layer fails, the voice data packet is discarded at the MAC layer. Consequently, noise or unclear voice occurs during a VOIP call, resulting in low quality of the VOIP call.

Therefore, how to improve the transmission reliability of the voice data packet and further ensure relatively good call quality becomes a technical problem that urgently needs to be resolved currently during the VOIP call.

SUMMARY

Embodiments of this application provide a data packet retransmission method and apparatus, to improve transmission reliability of a voice data packet.

The embodiments of this application are implemented as follows:

According to a first aspect, an embodiment of this application provides a data packet retransmission method.

The method includes: a radio link control RLC protocol entity of a transmit end sends a target sequence number and a first data packet to a medium access control MAC entity of the transmit end, where the RLC entity of the transmit end is in an unacknowledged mode, and the target sequence number is a sequence number of the first data packet; the RLC entity of the transmit end records a quantity of times that the target sequence number is transmitted to the MAC entity of the transmit end at an RLC layer; when the RLC entity of the transmit end receives the target sequence number and a negative acknowledgement that are sent by the MAC entity of the transmit end, the RLC entity of the transmit end obtains the RLC layer transmission count corresponding to the target sequence number; and when the RLC entity of the transmit end determines that the RLC layer transmission count is less than an RLC layer transmission threshold, the RLC entity of the transmit end sends a retransmission instruction based on the first data packet to the MAC entity of the transmit end.

In the first aspect, when a quantity of negative acknowledgements that is received by the MAC entity of the transmit end, and that is based on a second data packet, is greater than a MAC layer transmission threshold, it indicates that the second data packet at the MAC layer fails to be transmitted. Because the second data packet is generated by the first data packet, the MAC entity of the transmit end sends the target sequence number and the negative acknowledgement that are of the first data packet to the RLC entity of the transmit end, so that the RLC entity of the transmit end determines whether to trigger retransmission at the RLC layer. When the RLC entity of the transmit end determines that the first data packet corresponding to the target sequence number meets a retransmission condition, the RLC entity of the transmit end sends the retransmission instruction based on the first data packet to the MAC entity of the transmit end, so that the MAC entity of the transmit end triggers a transmission process based on the second data packet. Therefore, in this embodiment of this application, when the retransmission condition at the RLC layer is met, the RLC entity of the transmit end triggers the retransmission at the RLC layer, thereby increasing a quantity of transmissions of a data packet, and further increasing a possibility of successful data packet transmission. Therefore, this embodiment of this application can improve transmission reliability of a voice data packet and further ensure relatively good call quality.

In a possible implementation, before the RLC entity of the transmit end sends the first data packet and the target sequence number to the MAC entity of the transmit end, the method further includes: the RLC entity of the transmit end stores a mapping relationship between the target sequence number and the first data packet in a cache area.

A purpose of storing the mapping relationship between the target sequence number and the first data packet in the cache area is as follows: If the first data packet meets the retransmission condition at the RLC layer, the RLC entity of the transmit end may send the first data packet that corresponds to the target sequence number and that is in the cache area, to the MAC entity of the transmit end. Therefore, the MAC entity of the transmit end may regenerate the second data packet based on the first data packet, and then send the second data packet to a MAC entity of a receive end.

In a possible implementation, before the RLC entity of the transmit end sends the retransmission instruction based on the first data packet to the MAC entity of the transmit end, the method further includes: the RLC entity of the transmit end obtains the first data packet that corresponds to the target sequence number and that is in the cache area, and the RLC entity of the transmit end generates, based on the first data packet and the target sequence number, the retransmission instruction based on the first data packet; or the RLC entity of the transmit end obtains the first data packet that corresponds to the target sequence number and that is in the cache area, and the RLC entity of the transmit end generates, based on the first data packet in the cache area, the retransmission instruction based on the first data packet.

In a first manner, the retransmission instruction based on the first data packet may include the first data packet and the target sequence number, so that after receiving the retransmission instruction, the MAC entity of the transmit end can obtain the first data packet and the target sequence number that are in the retransmission instruction. In this case, the target sequence number and the negative acknowledgement may be sent together to the RLC entity of the transmit end if transmission at the MAC layer fails.

In a second manner, the retransmission instruction based on the first data packet may include the first data packet, so that after receiving the retransmission instruction, the MAC entity of the transmit end can obtain the first data packet in the retransmission instruction and extract the target sequence number from the first data packet. In this case, the target sequence number and the negative acknowledgement may be sent together to the RLC entity of the transmit end if transmission at the MAC layer fails.

In a possible implementation, after the RLC entity of the transmit end records the quantity of times that the target sequence number is transmitted to the MAC entity of the transmit end at the RLC layer, the method further includes:

When the RLC entity of the transmit end receives the target sequence number and an acknowledgement that are sent by the MAC entity of the transmit end, the RLC entity of the transmit end deletes the mapping relationship between the target sequence number and the first data packet from the cache area.

If the RLC entity of the transmit end receives the target sequence number and the acknowledgement that are sent by the MAC entity of the transmit end, it indicates that the first data packet corresponding to the target sequence number has been successfully transmitted, and the mapping relationship between the target sequence number and the first data packet may be deleted from the cache area, to save storage space.

In a possible implementation, after the RLC entity of the transmit end obtains the RLC layer transmission count corresponding to the target sequence number, the method further includes: when the RLC entity of the transmit end determines that the RLC layer transmission count is greater than the RLC layer transmission threshold, the RLC entity of the transmit end deletes the mapping relationship between the target sequence number and the first data packet from the cache area.

If the RLC entity of the transmit end determines that the RLC layer transmission count is greater than the RLC layer transmission threshold, it indicates that the first data packet corresponding to the target sequence number fails to meet the retransmission condition at the RLC layer. Therefore, the RLC entity of the transmit end deletes the mapping relationship between the target sequence number and the first data packet from the cache area, to save storage space.

In a possible implementation, before the RLC entity of the transmit end sends the retransmission instruction based on the first data packet to the MAC entity of the transmit end, the method further includes: the RLC entity of the transmit end generates, based on the target sequence number and a retransmission identifier, the retransmission instruction based on the first data packet, where the retransmission identifier is used to indicate the MAC entity of the transmit end to retransmit the first data packet corresponding to the target sequence number.

If no cache area is set by the RLC entity of the transmit end, the cache area is set by the MAC entity of the transmit end. When generating the retransmission instruction based on the first data packet, the RLC entity of the transmit end does not put the first data packet in the retransmission instruction, but puts only the target sequence number and only the retransmission identifier, in the retransmission instruction, so that the MAC entity of the transmit end obtains, in the cache area, the first data packet corresponding to the target sequence number.

In a possible implementation, after the RLC entity of the transmit end records the quantity of times that the target sequence number is transmitted to the MAC entity of the transmit end at the RLC layer, the method further includes:

When the RLC entity of the transmit end receives the target sequence number and an acknowledgement that are sent by the MAC entity of the transmit end, the RLC entity of the transmit end sends a discarding instruction based on the first data packet to the MAC entity of the transmit end, where the discarding instruction includes the target sequence number and a discarding identifier, and the discarding identifier is used to indicate the MAC entity of the transmit end to delete a mapping relationship between the target sequence number and the first data packet.

If no cache area is set by the RLC entity of the transmit end, the cache area is set by the MAC entity of the transmit end. When the RLC entity of the transmit end receives the target sequence number and the acknowledgement that are sent by the MAC entity of the transmit end, it indicates that the first data packet corresponding to the target sequence number has been successfully transmitted. Therefore, the RLC entity of the transmit end sends the discarding instruction based on the first data packet to the MAC entity of the transmit end, so that the MAC entity of the transmit end deletes the mapping relationship between the target sequence number and the first data packet based on the discarding instruction, to save storage space.

In a possible implementation, after the RLC entity of the transmit end obtains the RLC layer transmission count corresponding to the target sequence number, the method further includes:

When the RLC entity of the transmit end determines that the RLC layer transmission count is greater than the RLC layer transmission threshold, the RLC entity of the transmit end sends a discarding instruction based on the first data packet to the MAC entity of the transmit end, where the discarding instruction includes the target sequence number and a discarding identifier, and the discarding identifier is used to indicate the MAC entity of the transmit end to delete a mapping relationship between the target sequence number and the first data packet.

If no cache area is set by the RLC entity of the transmit end, the cache area is set by the MAC entity of the transmit end. When the RLC entity of the transmit end determines that the RLC layer transmission count is greater than the RLC layer transmission threshold, it indicates that the first data packet corresponding to the target sequence number fails to meet the retransmission condition at the RLC layer. Therefore, the RLC entity of the transmit end sends the discarding instruction based on the first data packet to the MAC entity of the transmit end, so that the MAC entity of the transmit end deletes the mapping relationship between the target sequence number and the first data packet based on the discarding instruction, to save storage space.

According to second aspect, an embodiment of this application provides a data packet retransmission method.

The method includes: A MAC entity of a transmit end receives a target sequence number and a first data packet that are sent by an RLC entity of the transmit end, where the RLC entity of the transmit end is in an unacknowledged mode, and the target sequence number is a sequence number of the first data packet; the MAC entity of the transmit end generates a second data packet based on the first data packet; the MAC entity of the transmit end sends the second data packet to a MAC entity of a receive end; when a quantity of negative acknowledgements that is received by the MAC entity of the transmit end, that is sent by the MAC entity of the receive end, and that is based on the second data packet, is greater than a MAC layer transmission threshold, the MAC entity of the transmit end sends the target sequence number and the negative acknowledgement to the RLC entity of the transmit end; and when the MAC entity of the transmit end receives a retransmission instruction that is sent by the RLC entity of the transmit end and that is based on the first data packet, the MAC entity of the transmit end triggers a transmission process based on the second data packet.

In the second aspect, when the quantity of the negative acknowledgements that is received by the MAC entity of the transmit end, and that is based on the second data packet, is greater than the MAC layer transmission threshold, it indicates that the second data packet at the MAC layer fails to be transmitted. Because the second data packet is generated by the first data packet, the MAC entity of the transmit end sends the target sequence number and the negative acknowledgement that are of the first data packet to the RLC entity of the transmit end, so that the RLC entity of the transmit end determines whether to trigger retransmission at the RLC layer. When the RLC entity of the transmit end determines that the first data packet corresponding to the target sequence number meets a retransmission condition, the RLC entity of the transmit end sends the retransmission instruction based on the first data packet to the MAC entity of the transmit end, so that the MAC entity of the transmit end triggers the transmission process based on the second data packet. Therefore, in this embodiment of this application, when the retransmission condition at the RLC layer is met, the RLC entity of the transmit end triggers the retransmission at the RLC layer, thereby increasing a quantity of transmissions of a data packet, and further increasing a possibility of successful data packet transmission. Therefore, this embodiment of this application can improve transmission reliability of a voice data packet and further ensure relatively good call quality.

In a possible implementation, after the MAC entity of the transmit end receives the target sequence number and the first data packet that are sent by the RLC entity of the transmit end, the method further includes: the MAC entity of the transmit end stores a mapping relationship between the target sequence number and the first data packet in a cache area.

If no cache area is set by the RLC entity of the transmit end, the cache area is set by the MAC entity of the transmit end. After the RLC entity of the transmit end sends the target sequence number and the first data packet to the MAC entity of the transmit end, the MAC entity of the transmit end stores the mapping relationship between the target sequence number and the first data packet in the cache area.

In a possible implementation, that the MAC entity of the transmit end triggers the transmission process based on the second data packet includes: the MAC entity of the transmit end obtains the target sequence number and a retransmission identifier that are in the retransmission instruction, where the retransmission identifier is used to indicate the MAC entity of the transmit end to retransmit the first data packet corresponding to the target sequence number; the MAC entity of the transmit end obtains the first data packet that corresponds to the target sequence number and that is in the cache area; the MAC entity of the transmit end generates the second data packet based on the first data packet; and the MAC entity of the transmit end sends the second data packet to the MAC entity of the receive end.

If no cache area is set by the RLC entity of the transmit end, the cache area is set by the MAC entity of the transmit end. When the MAC entity of the transmit end receives the retransmission instruction that is sent by the RLC entity of the transmit end and that is based on the first data packet, the MAC entity of the transmit end obtains the target sequence number and the retransmission identifier in the retransmission instruction, and the first data packet that corresponds to the target sequence number and that is in the cache area, then generates the second data packet based on the first data packet, and finally, sends the second data packet to the MAC entity of the receive end, to implement the transmission process based on the second data packet.

In a possible implementation, after the MAC entity of the transmit end sends the target sequence number and the negative acknowledgement to the RLC entity of the transmit end, the method further includes: when the MAC entity of the transmit end receives a discarding instruction that is sent by the RLC entity of the transmit end and that is based on the first data packet, the MAC entity of the transmit end deletes the mapping relationship between the target sequence number and the first data packet from the cache area, where the discarding instruction includes the target sequence number and a discarding identifier, and the discarding identifier is used to indicate the MAC entity of the transmit end to delete the mapping relationship between the target sequence number and the first data packet from the cache area.

When the MAC entity of the transmit end receives the discarding instruction that is sent by the RLC entity of the transmit end and that is based on the first data packet, it indicates that the RLC entity of the transmit end determines that an RLC layer transmission count is not less than an RLC layer transmission threshold. That is, the first data packet does not meet the retransmission condition at the RLC layer. Therefore, the RLC entity of the transmit end sends the discarding instruction based on the first data packet to the MAC entity of the transmit end, so that the MAC entity of the transmit end deletes the mapping relationship between the target sequence number and the first data packet from the cache area, to save storage space.

In a possible implementation, after the MAC entity of the transmit end sends the second data packet to the MAC entity of the receive end, the method further includes: when the MAC entity of the transmit end receives an acknowledgement that is sent by the MAC entity of the receive end and that is based on the second data packet, the MAC entity of the transmit end sends the target sequence number and the acknowledgement to the RLC entity of the transmit end, and deletes the mapping relationship between the target sequence number and the first data packet from the cache area.

If no cache area is set by the RLC entity of the transmit end, the cache area is set by the MAC entity of the transmit end. When the MAC entity of the transmit end receives the acknowledgement that is sent by the MAC entity of the receive end and that is based on the second data packet, it indicates that the first data packet corresponding to the target sequence number has been successfully transmitted. Therefore, the MAC entity of the transmit end sends the target sequence number and the acknowledgement to the RLC entity of the transmit end, to notify the RLC entity of the transmit end that the first data packet has been successfully transmitted, and deletes the mapping relationship between the target sequence number and the first data packet from the cache area, to save storage space.

In a possible implementation, that the MAC entity of the transmit end triggers the transmission process based on the second data packet includes: the MAC entity of the transmit end obtains the first data packet in the retransmission instruction; the MAC entity of the transmit end generates the second data packet based on the first data packet; and the MAC entity of the transmit end sends the second data packet to the MAC entity of the receive end.

If no cache area is set by the MAC entity of the transmit end, the cache area is set by the RLC entity of the transmit end. When the MAC entity of the transmit end receives the retransmission instruction that is sent by the RLC entity of the transmit end and that is based on the first data packet, the MAC entity of the transmit end obtains the first data packet in the retransmission instruction, generates the second data packet based on the first data packet, and then sends the second data packet to the MAC entity of the receive end, to implement the transmission process based on the second data packet.

In a possible implementation, after the MAC entity of the transmit end sends the second data packet to the MAC entity of the receive end, the method further includes: when the MAC entity of the transmit end receives an acknowledgement that is sent by the MAC entity of the receive end and that is based on the second data packet, the MAC entity of the transmit end sends the target sequence number and the acknowledgement to the RLC entity of the transmit end.

If no cache area is set by the MAC entity of the transmit end, the cache area is set by the RLC entity of the transmit end. When the MAC entity of the transmit end receives the acknowledgement that is sent by the MAC entity of the receive end and that is based on the second data packet, it indicates that the first data packet corresponding to the target sequence number has been successfully transmitted. Therefore, the MAC entity of the transmit end sends the target sequence number and the acknowledgement to the RLC entity of the transmit end, to notify the RLC entity of the transmit end that the first data packet has been successfully transmitted, so that the RLC entity of the transmit end deletes the mapping relationship between the target sequence number and the first data packet from the cache area, to save storage space.

According to a third aspect, an embodiment of this application provides a data packet retransmission apparatus. The apparatus includes: a first sending module, configured to enable an RLC entity of a transmit end to send a target sequence number and a first data packet to a MAC entity of the transmit end, where the RLC entity of the transmit end is in an unacknowledged mode, and the target sequence number is a sequence number of the first data packet; a recording module, configured to enable the RLC entity of the transmit end to record a quantity of times that the target sequence number is transmitted to the MAC entity of the transmit end at an RLC layer; an obtaining module, configured to: when the RLC entity of the transmit end receives the target sequence number and a negative acknowledgement that are sent by the MAC entity of the transmit end, enable the RLC entity of the transmit end to obtain the RLC layer transmission count corresponding to the target sequence number; and a second sending module, configured to: when the RLC entity of the transmit end determines that the RLC layer transmission count is less than an RLC layer transmission threshold, enable the RLC entity of the transmit end to send a retransmission instruction based on the first data packet to the MAC entity of the transmit end.

In a possible implementation, the apparatus further includes: a storage module, configured to enable the RLC entity of the transmit end to store a mapping relationship between the target sequence number and the first data packet in a cache area.

In a possible implementation, the apparatus further includes: a first generation module, configured to enable the RLC entity of the transmit end to obtain the first data packet that corresponds to the target sequence number and that is in the cache area, and enable the RLC entity of the transmit end to generate, based on the first data packet and the target sequence number, the retransmission instruction based on the first data packet; or a second generation module, configured to: enable the RLC entity of the transmit end to obtain the first data packet that corresponds to the target sequence number and that is in the cache area, and enable the RLC entity of the transmit end to generate, based on the first data packet in the cache area, the retransmission instruction based on the first data packet.

In a possible implementation, the apparatus further includes: a first deletion module, configured to: when the RLC entity of the transmit end receives the target sequence number and an acknowledgement that are sent by the MAC entity of the transmit end, enable the RLC entity of the transmit end to delete the mapping relationship between the target sequence number and the first data packet from the cache area.

In a possible implementation, the apparatus further includes: a second deletion module, configured to: when the RLC entity of the transmit end determines that the RLC layer transmission count is greater than the RLC layer transmission threshold, enable the RLC entity of the transmit end to delete the mapping relationship between the target sequence number and the first data packet from the cache area.

In a possible implementation, the apparatus further includes: a third generation module, configured to enable the RLC entity of the transmit end to generate, based on the target sequence number and a retransmission identifier, the retransmission instruction based on the first data packet, where the retransmission identifier is used to indicate the MAC entity of the transmit end to retransmit the first data packet corresponding to the target sequence number.

In a possible implementation, the apparatus further includes: a third sending module, configured to: when the RLC entity of the transmit end receives the target sequence number and an acknowledgement that are sent by the MAC entity of the transmit end, enable the RLC entity of the transmit end to send a discarding instruction based on the first data packet to the MAC entity of the transmit end, where the discarding instruction includes the target sequence number and a discarding identifier, and the discarding identifier is used to indicate the MAC entity of the transmit end to delete a mapping relationship between the target sequence number and the first data packet.

In a possible implementation, the apparatus further includes: a fourth sending module, configured to: when the RLC entity of the transmit end determines that the RLC layer transmission count is greater than the RLC layer transmission threshold, enable the RLC entity of the transmit end to send a discarding instruction based on the first data packet to the MAC entity of the transmit end, where the discarding instruction includes the target sequence number and a discarding identifier, and the discarding identifier is used to indicate the MAC entity of the transmit end to delete a mapping relationship between the target sequence number and the first data packet.

According to a fourth aspect, an embodiment of this application provides a data packet retransmission apparatus. The apparatus includes: a receiving module, configured to enable a MAC entity of a transmit end to receive a target sequence number and a first data packet that are sent by an RLC entity of the transmit end, where the RLC entity of the transmit end is in an unacknowledged mode, and the target sequence number is a sequence number of the first data packet; a generation module, configured to enable the MAC entity of the transmit end to generate a second data packet based on the first data packet; a first sending module, configured to enable the MAC entity of the transmit end to send the second data packet to a MAC entity of a receive end; a second sending module, configured to: when a quantity of negative acknowledgements that is received by the MAC entity of the transmit end, that is sent by the MAC entity of the receive end, and that is based on the second data packet, is greater than a MAC layer transmission threshold, enable the MAC entity of the transmit end to send the target sequence number and the negative acknowledgement to the RLC entity of the transmit end; and a triggering module, configured to: when the MAC entity of the transmit end receives a retransmission instruction that is sent by the RLC entity of the transmit end and that is based on the first data packet, enable the MAC entity of the transmit end to trigger a transmission process based on the second data packet.

In a possible implementation, the apparatus further includes: a storage module, configured to enable the MAC entity of the transmit end to store a mapping relationship between the target sequence number and the first data packet in a cache area.

In a possible implementation, the triggering module is specifically configured to: enable the MAC entity of the transmit end to obtain the target sequence number and a retransmission identifier that are in the retransmission instruction, where the retransmission identifier is used to indicate the MAC entity of the transmit end to retransmit the first data packet corresponding to the target sequence number; enable the MAC entity of the transmit end to obtain the first data packet that corresponds to the target sequence number and that is in the cache area; enable the MAC entity of the transmit end to generate the second data packet based on the first data packet; and enable the MAC entity of the transmit end to send the second data packet to the MAC entity of the receive end.

In a possible implementation, the apparatus further includes: a first deletion module, configured to: when the MAC entity of the transmit end receives a discarding instruction that is sent by the RLC entity of the transmit end and that is based on the first data packet, enable the MAC entity of the transmit end to delete the mapping relationship between the target sequence number and the first data packet from the cache area, where the discarding instruction includes the target sequence number and a discarding identifier, and the discarding identifier is used to indicate the MAC entity of the transmit end to delete the mapping relationship between the target sequence number and the first data packet from the cache area.

In a possible implementation, the apparatus further includes: a second deletion module, configured to: when the MAC entity of the transmit end receives an acknowledgement that is sent by the MAC entity of the receive end and that is based on the second data packet, enable the MAC entity of the transmit end to send the target sequence number and the acknowledgement to the RLC entity of the transmit end, and delete the mapping relationship between the target sequence number and the first data packet from the cache area.

In a possible implementation, the triggering module is specifically configured to: enable the MAC entity of the transmit end to obtain the first data packet in the retransmission instruction; enable the MAC entity of the transmit end to generate the second data packet based on the first data packet; and enable the MAC entity of the transmit end to send the second data packet to the MAC entity of the receive end.

In a possible implementation, the apparatus further includes: a third sending module, configured to: when the MAC entity of the transmit end receives an acknowledgement that is sent by the MAC entity of the receive end and that is based on the second data packet, enable the MAC entity of the transmit end to send the target sequence number and the acknowledgement to the RLC entity of the transmit end.

According to a fifth aspect, an embodiment of this application provides a base station. The base station includes a processor, a memory, and a transceiver. The processor, the memory, and the transceiver communicate with each other by using an internal connection path. The memory is configured to store an instruction. The processor is configured to execute the instruction stored in the memory, to control the transceiver to receive and send a signal, and when the processor executes the instruction stored in the memory, the processor performs the method according to any one of the first aspect or the possible implementations of the first aspect or the second aspect or the possible implementations of the second aspect.

According to a sixth aspect, an embodiment of this application provides a terminal. The terminal includes a processor, a memory, and a transceiver. The processor, the memory, and the transceiver communicate with each other by using an internal connection path. The memory is configured to store an instruction. The processor is configured to execute the instruction stored in the memory, to control the transceiver to receive and send a signal, and when the processor executes the instruction stored in the memory, the processor performs the method according to any one of the first aspect or the possible implementations of the first aspect or the second aspect or the possible implementations of the second aspect.

According to a seventh aspect, an embodiment of this application provides a computer-readable storage medium. The computer-readable storage medium stores an instruction. When the instruction is run on a computer, the computer is enabled to perform the method according to any one of the first aspect or the possible implementations of the first aspect.

According to an eighth aspect, an embodiment of this application provides a computer-readable storage medium. The computer-readable storage medium stores an instruction. When the instruction is run on a computer, the computer is enabled to perform the method according to any one of the second aspect or the possible implementation of the second aspect.

According to a ninth aspect, an embodiment of this application provides a computer program product including an instruction. When the computer program product runs on a computer, the computer is enabled to perform the method according to any one of the first aspect or the possible implementations of the first aspect.

According to a tenth aspect, an embodiment of this application provides a computer program product including an instruction. When the computer program product runs on a computer, the computer is enabled to perform the method according to any one of the second aspect or the possible implementations of the second aspect.

DESCRIPTION OF EMBODIMENTS

Figure 1:
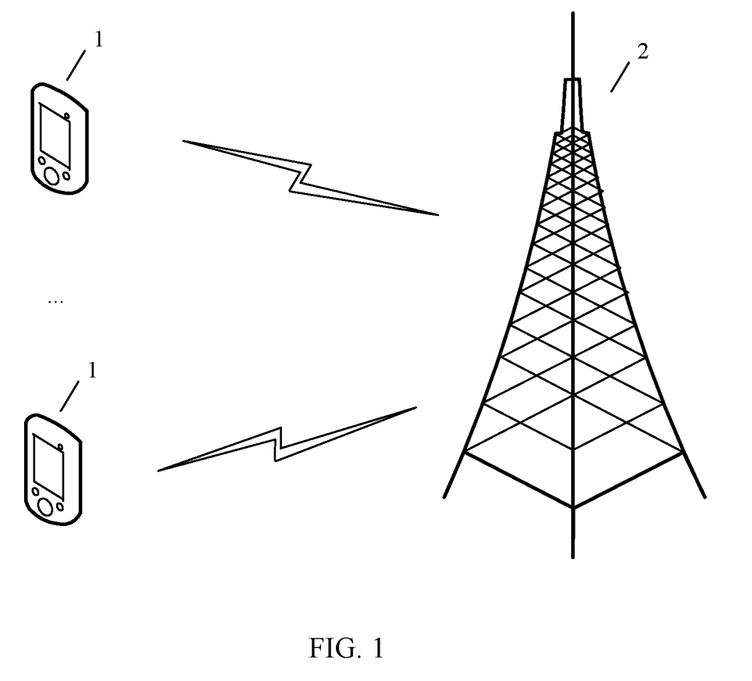
FIG. 1 is a schematic scenario diagram of a base station and a terminal according to an embodiment of this application.

FIG. 1 is a schematic scenario diagram of a base station and a terminal according to an embodiment of this application. A scenario shown in FIG. 1 includes a terminal 1 and a base station 2. When the terminal 1 sends data to the base station 2, the terminal 1 is a transmit end, and the base station 2 is a receive end. When the base station 2 sends data to the terminal 1, the base station 2 is a transmit end, and the terminal 1 is a receive end.

Figure 2:
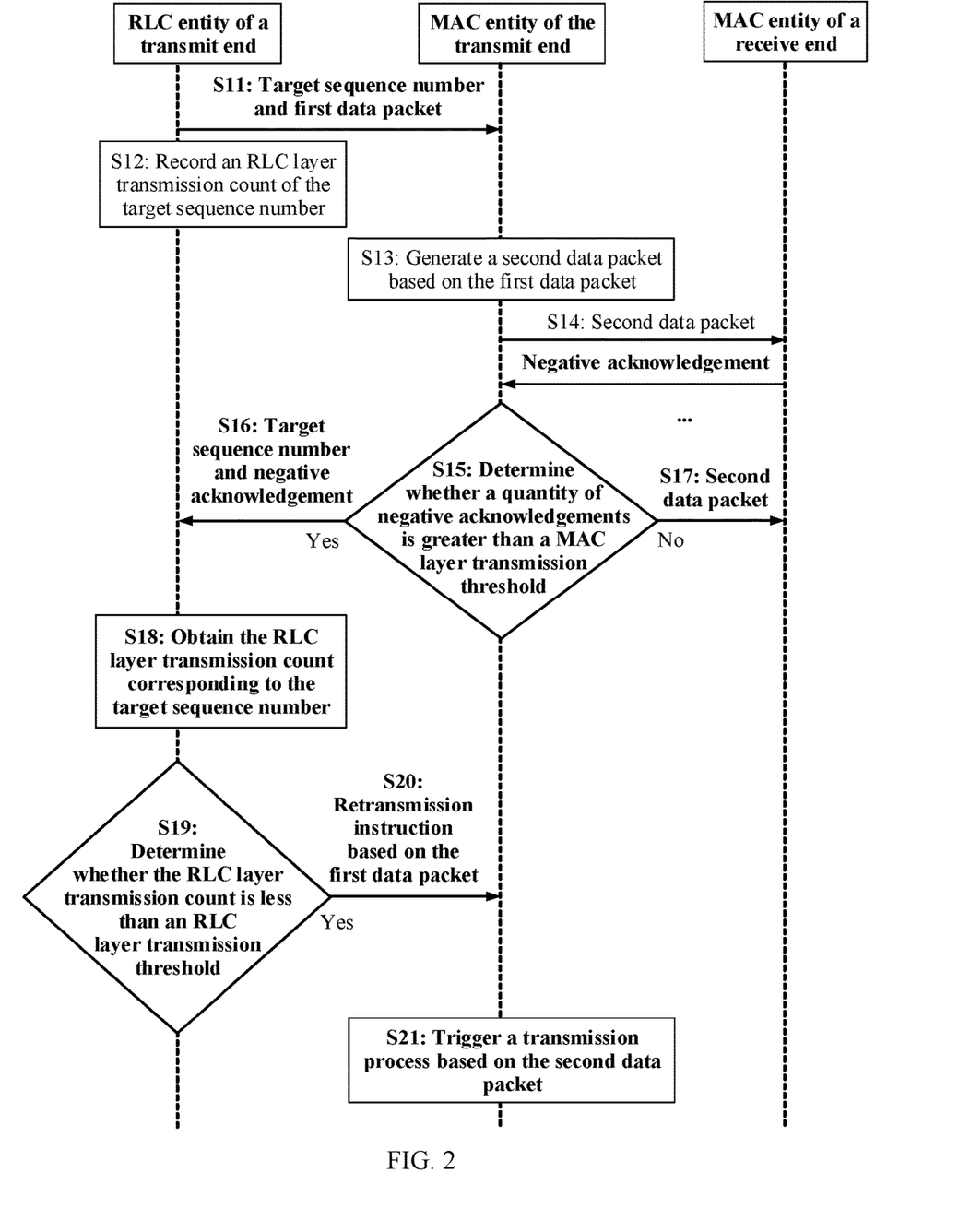
FIG. 2 is a signaling exchange diagram of a data packet retransmission method according to an embodiment of this application.

FIG. 2 is a signaling exchange diagram of a data packet retransmission method according to an embodiment of this application. The method shown in FIG. 2 can improve transmission reliability of a voice data packet. The method includes the following steps.

Step S11: An RLC entity of a transmit end sends a target sequence number and a first data packet to a MAC entity of the transmit end.

If the transmit end is a base station, the receive end is a terminal. If the transmit end is a terminal, the receive end is a base station.

The RLC entity of the transmit end is in an unacknowledged mode. The target sequence number is a sequence number of the first data packet, and the first data packet stores the target sequence number.

Step S12: The RLC entity of the transmit end records a quantity of times that the target sequence number is transmitted to the MAC entity of the transmit end at an RLC layer.

The RLC layer transmission count is a quantity of times that the RLC entity of the transmit end sends the target sequence number to the MAC entity of the transmit end.

Step S13: The MAC entity of the transmit end generates a second data packet based on the first data packet.

The first data packet is not only a protocol data unit (PDU) at the RLC layer, but also a service data unit (SDU) at a MAC layer. The second data packet is a PDU at the MAC layer.

The MAC entity of the transmit end generates the PDU at the MAC layer based on the SDU at the MAC layer, based on a protocol.

Step S14: The MAC entity of the transmit end sends the second data packet to a MAC entity of a receive end.

After step S14, the MAC entity of the receive end returns a feedback response based on the second data packet to the MAC entity of the transmit end. If the MAC entity of the receive end receives the second data packet sent by the MAC entity of the transmit end, the MAC entity of the receive end sends an acknowledgement (ACK) to the MAC entity of the transmit end. If the MAC entity of the receive end does not receive the second data packet sent by the MAC entity of the transmit end, the MAC entity of the receive end sends a negative acknowledgement (NACK) to the MAC entity of the transmit end.

Step S15: The MAC entity of the transmit end determines whether a quantity of received negative acknowledgements that are sent by the MAC entity of the receive end and that are based on the second data packet, is greater than a MAC layer transmission threshold; and if yes, performs step S16; otherwise, performs step S17.

The MAC layer transmission threshold is a preset value. For example, assuming that the MAC layer transmission threshold is preset to 10, the MAC entity of the transmit end determines whether the quantity of received negative acknowledgements that are sent by the MAC entity of the receive end and that are based on the second data packet, is greater than 10.

If the quantity of the negative acknowledgements that is received by the MAC entity of the transmit end, that is sent by the MAC entity of the receive end, and that is based on the second data packet, is greater than the MAC layer transmission threshold, it indicates that a maximum quantity of a HARQ is reached. In this case, the MAC entity of the transmit end sends the target sequence number and the negative acknowledgement to the RLC entity of the transmit end, to enable the RLC entity of the transmit end to determine whether retransmission at the RLC layer of the transmit end needs to be triggered.

If the quantity of the negative acknowledgements that is received by the MAC entity of the transmit end, that is sent by the MAC entity of the receive end, and that is based on the second data packet, is not greater than the MAC layer transmission threshold, it indicates that the maximum quantity of the HARQ is not reached. In this case, the MAC entity of the transmit end sends the second data packet to the MAC entity of the receive end. Because there is a HARQ mechanism at the MAC layer, the MAC entity of the transmit end sends the second data packet to the MAC entity of the receive end, provided that the quantity of NACKs that are received by the MAC entity of the transmit end, is less than the MAC layer transmission threshold.

Step S16: The MAC entity of the transmit end sends the target sequence number and the negative acknowledgement to the RLC entity of the transmit end.

Step S17: The MAC entity of the transmit end sends the second data packet to the MAC entity of the receive end.

Step S18: When the RLC entity of the transmit end receives the target sequence number and the negative acknowledgement that are sent by the MAC entity of the transmit end, the RLC entity of the transmit end obtains the RLC layer transmission count corresponding to the target sequence number.

The RLC entity of the transmit end needs to determine, based on the RLC layer transmission count corresponding to the target sequence number, whether to trigger the retransmission at the RLC layer of the transmit end.

Step S19: The RLC entity of the transmit end determines whether the RLC layer transmission count is less than the RLC layer transmission threshold; and if yes, performs step S20.

The RLC layer transmission threshold is a preset value. For example, assuming that the RLC layer transmission threshold is preset to 3, the RLC entity of the transmit end determines whether the RLC layer transmission count is less than 3.

Step S20: The RLC entity of the transmit end sends a retransmission instruction based on the first data packet to the MAC entity of the transmit end.

If the RLC entity of the transmit end determines that the RLC layer transmission count is less than the RLC layer transmission threshold, it indicates that the retransmission at the RLC layer of the transmit end can be triggered. In this case, the RLC entity of the transmit end sends the retransmission instruction based on the first data packet to the MAC entity of the transmit end. The retransmission instruction is used to indicate the MAC entity of the transmit end to re-trigger the HARQ mechanism based on the second data packet.

Step S21: When the MAC entity of the transmit end receives the retransmission instruction that is sent by the RLC entity of the transmit end and that is based on the first data packet, the MAC entity of the transmit end triggers a transmission process based on the second data packet.

If the MAC entity of the transmit end receives the retransmission instruction, the MAC entity of the transmit end may re-trigger the HARQ mechanism based on the second data packet.

In the embodiment shown in FIG. 2, when the quantity of the negative acknowledgements that is received by the MAC entity of the transmit end, and that is based on the second data packet, is greater than a MAC layer transmission threshold, it indicates that the second data packet at the MAC layer fails to be transmitted. Because the second data packet is generated by the first data packet, the MAC entity of the transmit end sends the target sequence number and a negative acknowledgement that are of the first data packet to the RLC entity of the transmit end, so that the RLC entity of the transmit end determines whether to trigger the retransmission at the RLC layer. When the RLC entity of the transmit end determines that the first data packet corresponding to the target sequence number meets a retransmission condition, the RLC entity of the transmit end sends the retransmission instruction based on the first data packet to the MAC entity of the transmit end, so that the MAC entity of the transmit end triggers the transmission process based on the second data packet. Therefore, in this embodiment of this application, when the retransmission condition at the RLC layer is met, the RLC entity of the transmit end triggers the retransmission at the RLC layer, thereby increasing a quantity of transmissions of a data packet, and further increasing a possibility of successful data packet transmission. Therefore, this embodiment of this application can improve transmission reliability of a voice data packet and further ensure relatively good call quality.

In an implementable embodiment, before step S11, the data packet retransmission method may further include the following step: The RLC entity of the transmit end stores a mapping relationship between the target sequence number and the first data packet in a cache area.

A purpose of storing the mapping relationship between the target sequence number and the first data packet in the cache area is as follows: If the first data packet meets the retransmission condition at the RLC layer, the RLC entity of the transmit end may send the first data packet that corresponds to the target sequence number and that is in the cache area, to the MAC entity of the transmit end. Therefore, the MAC entity of the transmit end may regenerate the second data packet based on the first data packet, and then send the second data packet to the MAC entity of the receive end.

In an implementable embodiment, before step S20, the data packet retransmission method may further include the following steps: The RLC entity of the transmit end obtains the first data packet that corresponds to the target sequence number and that is in the cache area, and the RLC entity of the transmit end generates, based on the first data packet and the target sequence number, the retransmission instruction based on the first data packet.

The retransmission instruction based on the first data packet may include the first data packet and the target sequence number, so that after receiving the retransmission instruction, the MAC entity of the transmit end can obtain the first data packet and the target sequence number that are in the retransmission instruction. In this case, the target sequence number and the negative acknowledgement may be sent together to the RLC entity of the transmit end, if transmission at the MAC layer fails.

In an implementable embodiment, before step S20, the data packet retransmission method may further include the following step: The RLC entity of the transmit end obtains the first data packet that corresponds to the target sequence number and that is in the cache area, and the RLC entity of the transmit end generates, based on the first data packet in the cache area, the retransmission instruction based on the first data packet.

The retransmission instruction based on the first data packet may include the first data packet, so that after receiving the retransmission instruction, the MAC entity of the transmit end can obtain the first data packet in the retransmission instruction and extract the target sequence number from the first data packet. In this case, the target sequence number and the negative acknowledgement may be sent together to the RLC entity of the transmit end, if the transmission at the MAC layer fails.

In an implementable embodiment, after step S12, the data packet retransmission method may further include the following step: When the RLC entity of the transmit end receives the target sequence number and the acknowledgement that are sent by the MAC entity of the transmit end, the RLC entity of the transmit end deletes the mapping relationship, in the cache area, between the target sequence number and the first data packet.

If the RLC entity of the transmit end receives the target sequence number and the acknowledgement that are sent by the MAC entity of the transmit end, it indicates that the first data packet corresponding to the target sequence number has been successfully transmitted, and the mapping relationship between the target sequence number and the first data packet may be deleted from the cache area, to save storage space.

In an implementable embodiment, after step S18, the data packet retransmission method may further include the following step: When the RLC entity of the transmit end determines that the RLC layer transmission count is greater than the RLC layer transmission threshold, the RLC entity of the transmit end deletes the mapping relationship between the target sequence number and the first data packet from the cache area.

If the RLC entity of the transmit end determines that the RLC layer transmission count is greater than the RLC layer transmission threshold, it indicates that the first data packet corresponding to the target sequence number fails to meet the retransmission condition at the RLC layer. Therefore, the RLC entity of the transmit end deletes the mapping relationship between the target sequence number and the first data packet from the cache area, to save storage space.

In an implementable embodiment, before step S20, the data packet retransmission method may further include the following step: The RLC entity of the transmit end generates, based on the target sequence number and a retransmission identifier, the retransmission instruction based on the first data packet, where the retransmission identifier is used to indicate the MAC entity of the transmit end to retransmit the first data packet corresponding to the target sequence number.

If no cache area is set by the RLC entity of the transmit end, the cache area is set by the MAC entity of the transmit end. When generating the retransmission instruction based on the first data packet, the RLC entity of the transmit end does not put the first data packet in the retransmission instruction, but puts only the target sequence number and only the retransmission identifier, in the retransmission instruction, so that the MAC entity of the transmit end obtains, in the cache area, the first data packet corresponding to the target sequence number.

In an implementable embodiment, after step S14, the data packet retransmission method may further include the following step: When the RLC entity of the transmit end receives the target sequence number and the acknowledgement that are sent by the MAC entity of the transmit end, the RLC entity of the transmit end sends an abandonment instruction based on the first data packet to the MAC entity of the transmit end, where the abandonment instruction includes the target sequence number and an abandonment identifier, and the abandonment identifier is used to indicate the MAC entity of the transmit end to delete the mapping relationship between the target sequence number and the first data packet.

If no cache area is set by the RLC entity of the transmit end, the cache area is set by the MAC entity of the transmit end. When the RLC entity of the transmit end receives the target sequence number and the acknowledgement that are sent by the MAC entity of the transmit end, it indicates that the first data packet corresponding to the target sequence number has been successfully transmitted. Therefore, the RLC entity of the transmit end sends the discarding instruction based on the first data packet to the MAC entity of the transmit end, so that the MAC entity of the transmit end deletes the mapping relationship between the target sequence number and the first data packet based on the discarding instruction, to save storage space.

In an implementable embodiment, after step S18, the data packet retransmission method may further include the following step: When the RLC entity of the transmit end determines that the RLC layer transmission count is greater than the RLC layer transmission threshold, the RLC entity of the transmit end sends a discarding instruction based on the first data packet to the MAC entity of the transmit end, where the discarding instruction includes the target sequence number and a discarding identifier, and the discarding identifier is used to indicate the MAC entity of the transmit end to delete a mapping relationship between the target sequence number and the first data packet.

If no cache area is set by the RLC entity of the transmit end, the cache area is set by the MAC entity of the transmit end. When the RLC entity of the transmit end determines that the RLC layer transmission count is greater than the RLC layer transmission threshold, it indicates that the first data packet corresponding to the target sequence number fails to meet the retransmission condition at the RLC layer. Therefore, the RLC entity of the transmit end sends the discarding instruction based on the first data packet to the MAC entity of the transmit end, so that the MAC entity of the transmit end deletes the mapping relationship between the target sequence number and the first data packet based on the discarding instruction, to save storage space.

In an implementable embodiment, after step S11, the data packet retransmission method may further include the following step: The MAC entity of the transmit end stores the mapping relationship between the target sequence number and the first data packet in the cache area.

If no cache area is set by the RLC entity of the transmit end, the cache area is set by the MAC entity of the transmit end. After the RLC entity of the transmit end sends the target sequence number and the first data packet to the MAC entity of the transmit end, the MAC entity of the transmit end stores the mapping relationship between the target sequence number and the first data packet in the cache area.

In an implementable embodiment, in step S21, that "the MAC entity of the transmit end triggers the transmission process based on the second data packet" may further include the following steps: The MAC entity of the transmit end obtains the target sequence number and a retransmission identifier that are in the retransmission instruction, where the retransmission identifier is used to indicate the MAC entity of the transmit end to retransmit the first data packet corresponding to the target sequence number; the MAC entity of the transmit end obtains the first data packet that corresponds to the target sequence number and that is in the cache area; the MAC entity of the transmit end generates the second data packet based on the first data packet; and the MAC entity of the transmit end sends the second data packet to the MAC entity of the receive end.

If no cache area is set by the RLC entity of the transmit end, the cache area is set by the MAC entity of the transmit end. When the MAC entity of the transmit end receives the retransmission instruction that is sent by the RLC entity of the transmit end and that is based on the first data packet, the MAC entity of the transmit end obtains the target sequence number and the retransmission identifier in the retransmission instruction, and the first data packet that corresponds to the target sequence number and that is in the cache area, then generates the second data packet based on the first data packet, and finally, sends the second data packet to the MAC entity of the receive end, to implement the transmission process based on the second data packet.

In an implementable embodiment, after step S18, the data packet retransmission method may further include the following step: When the MAC entity of the transmit end receives the abandonment instruction that is sent by the RLC entity of the transmit end, and that is based on the first data packet, the MAC entity of the transmit end deletes the mapping relationship, in the cache area, between the target sequence number and the first data packet, where the abandonment instruction includes the target sequence number and an abandonment identifier, and the abandonment identifier is used to indicate the MAC entity of the transmit end to delete the mapping relationship between, in the cache area, the target sequence number and the first data packet.

When the MAC entity of the transmit end receives the discarding instruction that is sent by the RLC entity of the transmit end and that is based on the first data packet, it indicates that the RLC entity of the transmit end determines that an RLC layer transmission count is not less than an RLC layer transmission threshold. That is, the first data packet does not meet the retransmission condition at the RLC layer. Therefore, the RLC entity of the transmit end sends the discarding instruction based on the first data packet to the MAC entity of the transmit end, so that the MAC entity of the transmit end deletes the mapping relationship between the target sequence number and the first data packet from the cache area, to save storage space.

In an implementable embodiment, after step S14, the data packet retransmission method may further include the following step: When the MAC entity of the transmit end receives the acknowledgement that is sent by the MAC entity of the receive end and that is based on the second data packet, the MAC entity of the transmit end sends the target sequence number and the acknowledgement to the RLC entity of the transmit end, and deletes the mapping relationship between the target sequence number and the first data packet from the cache area.

If no cache area is set by the RLC entity of the transmit end, the cache area is set by the MAC entity of the transmit end. When the MAC entity of the transmit end receives the acknowledgement that is sent by the MAC entity of the receive end and that is based on the second data packet, it indicates that the first data packet corresponding to the target sequence number has been successfully transmitted. Therefore, the MAC entity of the transmit end sends the target sequence number and the acknowledgement to the RLC entity of the transmit end, to notify the RLC entity of the transmit end that the first data packet has been successfully transmitted, and deletes the mapping relationship between the target sequence number and the first data packet from the cache area, to save storage space.

In an implementable embodiment, in step S21, that "the MAC entity of the transmit end triggers the transmission process based on the second data packet" may further include the following steps: The MAC entity of the transmit end obtains the first data packet in the retransmission instruction; the MAC entity of the transmit end generates the second data packet based on the first data packet; and the MAC entity of the transmit end sends the second data packet to the MAC entity of the receive end.

If no cache area is set by the MAC entity of the transmit end, the cache area is set by the RLC entity of the transmit end. When the MAC entity of the transmit end receives the retransmission instruction that is sent by the RLC entity of the transmit end and that is based on the first data packet, the MAC entity of the transmit end obtains the first data packet in the retransmission instruction, generates the second data packet based on the first data packet, and then sends the second data packet to the MAC entity of the receive end, to implement the transmission process based on the second data packet.

In an implementable embodiment, after step S14, the data packet retransmission method may further include the following step: When the MAC entity of the transmit end receives the acknowledgement that is sent by the MAC entity of the receive end and that is based on the second data packet, the MAC entity of the transmit end sends the target sequence number and the acknowledgement to the RLC entity of the transmit end.

If no cache area is set by the MAC entity of the transmit end, the cache area is set by the RLC entity of the transmit end. When the MAC entity of the transmit end receives the acknowledgement that is sent by the MAC entity of the receive end and that is based on the second data packet, it indicates that the first data packet corresponding to the target sequence number has been successfully transmitted. Therefore, the MAC entity of the transmit end sends the target sequence number and the acknowledgement to the RLC entity of the transmit end, to notify the RLC entity of the transmit end that the first data packet has been successfully transmitted, so that the RLC entity of the transmit end deletes the mapping relationship between the target sequence number and the first data packet from the cache area, to save storage space.

Figure 3:
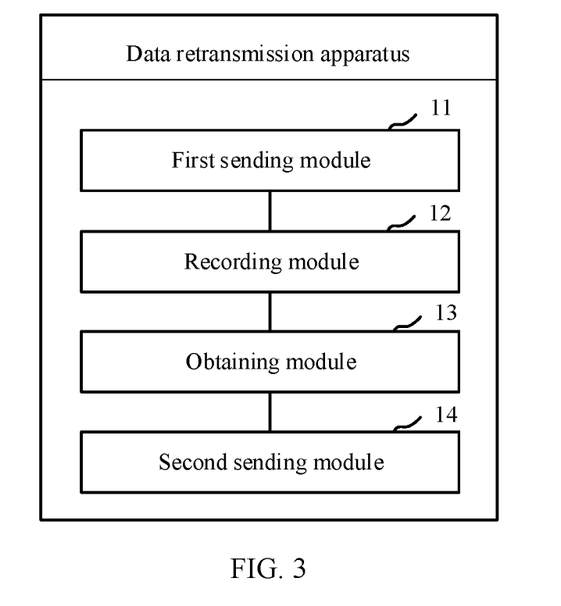
FIG. 3 is a schematic diagram of a data packet retransmission apparatus according to an embodiment of this application.

FIG. 3 is a schematic diagram of a data packet retransmission apparatus according to an embodiment of this application. The data packet retransmission apparatus includes the following modules:

A first sending module 11, configured to enable an RLC entity of a transmit end to send a target sequence number and a first data packet to a MAC entity of the transmit end, where the RLC entity of the transmit end is in an unacknowledged mode, and the target sequence number is a sequence number of the first data packet, where for a specific detailed implementation, refer to the detailed description of step S11 in the method embodiment shown in FIG. 2.

A recording module 12, configured to enable the RLC entity of the transmit end to record a quantity of times that the target sequence number is transmitted to the MAC entity of the transmit end at an RLC layer, where for a specific detailed implementation, refer to the detailed description of step S12 in the method embodiment shown in FIG. 2.

An obtaining module 13, configured to: when the RLC entity of the transmit end receives the target sequence number and a negative acknowledgement that are sent by the MAC entity of the transmit end, enable RLC entity of the transmit end to obtain the RLC layer transmission count corresponding to the target sequence number. For a specific detailed implementation, refer to the detailed description of step S18 in the method embodiment shown in FIG. 2.

A second sending module 14, configured to: when the RLC entity of the transmit end determines that the RLC layer transmission count is less than an RLC layer transmission threshold, enable the RLC entity of the transmit end to send a retransmission instruction based on the first data packet to the MAC entity of the transmit end, where for a specific detailed implementation, refer to the detailed description of step S20 in the method embodiment shown in FIG. 2.

In an implementable embodiment, the data packet retransmission apparatus further includes a storage module, configured to enable the RLC entity of the transmit end to store a mapping relationship between the target sequence number and the first data packet in a cache area. For a specific detailed implementation, refer to the corresponding detailed description in the method embodiment shown in FIG. 2.

In an implementable embodiment, the data packet retransmission apparatus further includes the following:

A first generation module, configured to: enable the RLC entity of the transmit end to obtain the first data packet that corresponds to the target sequence number and that is in the cache area, and enable the RLC entity of the transmit end to generate, based on the first data packet and the target sequence number, the retransmission instruction based on the first data packet, where for a specific detailed implementation, refer to the corresponding detailed description in the method embodiment shown in FIG. 2.

A second generation module, configured to: enable the RLC entity of the transmit end to obtain the first data packet that corresponds to the target sequence number and that is in the cache area, and enable the RLC entity of the transmit end to generate, based on the first data packet in the cache area, the retransmission instruction based on the first data packet, where for a specific detailed implementation, refer to the corresponding detailed description in the method embodiment shown in FIG. 2.

In an implementable embodiment, the data packet retransmission apparatus further includes a first deletion module, configured to: when the RLC entity of the transmit end receives the target sequence number and an acknowledgement that are sent by the MAC entity of the transmit end, enable the RLC entity of the transmit end to delete the mapping relationship between the target sequence number and the first data packet from the cache area. For a specific detailed implementation, refer to the corresponding detailed description in the method embodiment shown in FIG. 2.

In an implementable embodiment, the data packet retransmission apparatus further includes a second deletion module, configured to: when the RLC entity of the transmit end determines that the RLC layer transmission count is greater than the RLC layer transmission threshold, enable the RLC entity of the transmit end to delete the mapping relationship between the target sequence number and the first data packet from the cache area. For a specific detailed implementation, refer to the corresponding detailed description in the method embodiment shown in FIG. 2.

In an implementable embodiment, the data packet retransmission apparatus further includes a third generation module, configured to enable the RLC entity of the transmit end to generate, based on the target sequence number and a retransmission identifier, the retransmission instruction based on the first data packet, where the retransmission identifier is used to indicate the MAC entity of the transmit end to retransmit the first data packet corresponding to the target sequence number. For a specific detailed implementation, refer to the corresponding detailed description in the method embodiment shown in FIG. 2.

In an implementable embodiment, the data packet retransmission apparatus further includes a third sending module, configured to: when the RLC entity of the transmit end receives the target sequence number and an acknowledgement that are sent by the MAC entity of the transmit end, enable the RLC entity of the transmit end to send a discarding instruction based on the first data packet to the MAC entity of the transmit end, where the discarding instruction includes the target sequence number and a discarding identifier, and the discarding identifier is used to indicate the MAC entity of the transmit end to delete a mapping relationship between the target sequence number and the first data packet. For a specific detailed implementation, refer to the corresponding detailed description in the method embodiment shown in FIG. 2.

In an implementable embodiment, the data packet retransmission apparatus further includes a fourth sending module, configured to: when the RLC entity of the transmit end determines that the RLC layer transmission count is greater than the RLC layer transmission threshold, enable the RLC entity of the transmit end to send a discarding instruction based on the first data packet to the MAC entity of the transmit end, where the discarding instruction includes the target sequence number and a discarding identifier, and the discarding identifier is used to indicate the MAC entity of the transmit end to delete a mapping relationship between the target sequence number and the first data packet. For a specific detailed implementation, refer to the corresponding detailed description in the method embodiment shown in FIG. 2.

Figure 4:
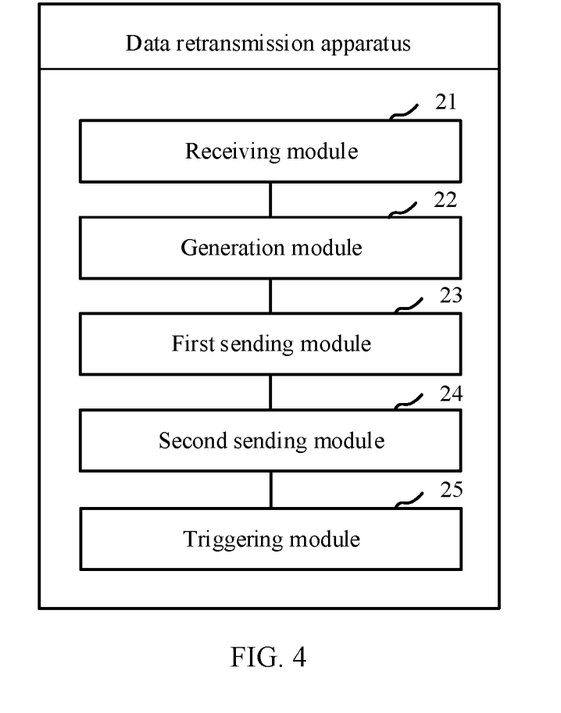
FIG. 4 is a schematic diagram of a data packet retransmission apparatus according to an embodiment of this application.

FIG. 4 is a schematic diagram of a data packet retransmission apparatus according to an embodiment of this application. The data packet retransmission apparatus includes the following modules:

A receiving module 21, configured to enable a MAC entity of a transmit end to receive a target sequence number and a first data packet that are sent by an RLC entity of the transmit end, where the RLC entity of the transmit end is in an unacknowledged mode, and the target sequence number is a sequence number of the first data packet; for a specific detailed implementation, refer to the detailed description of step S11 in the method embodiment shown in FIG. 2.

A generation module 22, configured to enable the MAC entity of the transmit end to generate a second data packet based on the first data packet, where for a specific detailed implementation, refer to the detailed description of step S13 in the method embodiment shown in FIG. 2.

A first sending module 23, configured to enable the MAC entity of the transmit end to send the second data packet to the MAC entity of the receive end, where for a specific detailed implementation, refer to the detailed description of step S14 in the method embodiment shown in FIG. 2.

A second sending module 24, configured to: when a quantity of negative acknowledgements that is received by the MAC entity of the transmit end, that is sent by the MAC entity of the receive end, and that is based on the second data packet, is greater than a MAC layer transmission threshold, enable the MAC entity of the transmit end to send the target sequence number and the negative acknowledgement to the RLC entity of the transmit end. For a specific detailed implementation, refer to the detailed description of step S16 in the method embodiment shown in FIG. 2.

A triggering module 25, configured to: when the MAC entity of the transmit end receives a retransmission instruction that is sent by the RLC entity of the transmit end and that is based on the first data packet, enable the MAC entity of the transmit end to trigger a transmission process based on the second data packet, where for a specific detailed implementation, refer to the detailed description of step S21 in the method embodiment shown in FIG. 2.

In an implementable embodiment, the data packet retransmission apparatus further includes a storage module, configured to enable the MAC entity of the transmit end to store a mapping relationship between the target sequence number and the first data packet in a cache area. For a specific detailed implementation, refer to the corresponding detailed description in the method embodiment shown in FIG. 2.

In an implementable embodiment, the triggering module 25 is specifically configured to: enable the MAC entity of the transmit end to obtain the target sequence number and a retransmission identifier that are in the retransmission instruction, where the retransmission identifier is used to indicate the MAC entity of the transmit end to retransmit the first data packet corresponding to the target sequence number; the MAC entity of the transmit end obtains the first data packet that corresponds to the target sequence number and that is in the cache area; enable the MAC entity of the transmit end to generate the second data packet based on the first data packet; and enable the MAC entity of the transmit end to send the second data packet to the MAC entity of the receive end. For a specific detailed implementation, refer to the corresponding detailed description in the method embodiment shown in FIG. 2.

In an implementable embodiment, the data packet retransmission apparatus further includes a first deletion module, configured to: when the MAC entity of the transmit end receives a discarding instruction that is sent by the RLC entity of the transmit end and that is based on the first data packet, enable the MAC entity of the transmit end to delete the mapping relationship between the target sequence number and the first data packet from the cache area, where the discarding instruction includes the target sequence number and a discarding identifier, and the discarding identifier is used to indicate the MAC entity of the transmit end to delete the mapping relationship between the target sequence number and the first data packet from the cache area. For a specific detailed implementation, refer to the corresponding detailed description in the method embodiment shown in FIG. 2.

In an implementable embodiment, the data packet retransmission apparatus further includes a second deletion module, configured to: when the MAC entity of the transmit end receives an acknowledgement that is sent by the MAC entity of the receive end and that is based on the second data packet, enable the MAC entity of the transmit end to send the target sequence number and the acknowledgement to the RLC entity of the transmit end, and delete the mapping relationship between the target sequence number and the first data packet from the cache area. For a specific detailed implementation, refer to the corresponding detailed description in the method embodiment shown in FIG. 2.

In an implementable embodiment, the triggering module 25 is specifically configured to: enable the MAC entity of the transmit end to obtain the first data packet in the retransmission instruction; enable the MAC entity of the transmit end to generate the second data packet based on the first data packet; and enable the MAC entity of the transmit end to send the second data packet to the MAC entity of the receive end. For a specific detailed implementation, refer to the corresponding detailed description in the method embodiment shown in FIG. 2.

In an implementable embodiment, the data packet retransmission apparatus further includes a third sending module, configured to: when the MAC entity of the transmit end receives an acknowledgement that is sent by the MAC entity of the receive end and that is based on the second data packet, enable the MAC entity of the transmit end to send the target sequence number and the acknowledgement to the RLC entity of the transmit end. For a specific detailed implementation, refer to the corresponding detailed description in the method embodiment shown in FIG. 2.

Figure 5:
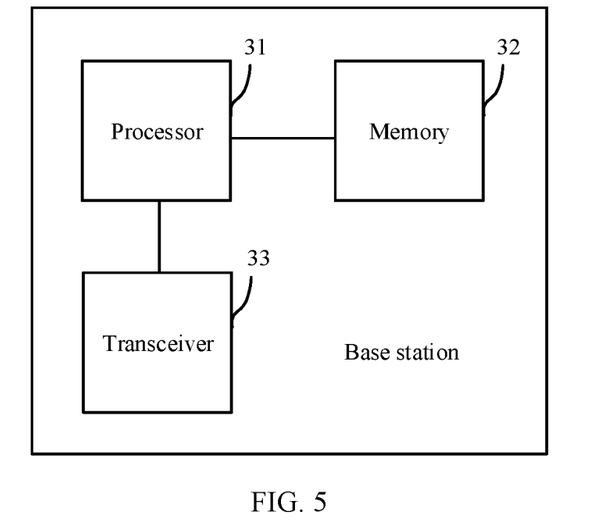
FIG. 5 is a schematic diagram of a base station according to an embodiment of this application.

FIG. 5 is a schematic diagram of a base station according to an embodiment of this application. Referring to FIG. 5, the base station includes a processor 31, a memory 32, and a transceiver 33. The processor 31, the memory 32, and the transceiver 33 communicate with each other by using an internal connection path. The memory 32 is configured to store an instruction. The processor 31 is configured to execute the instruction stored in the memory 32, to control the transceiver 33 to receive a signal and send a signal, and when the processor 31 executes the instruction stored in the memory 32, the processor 31 performs the steps of the transmit end in the method shown in FIG. 2.

Figure 6:
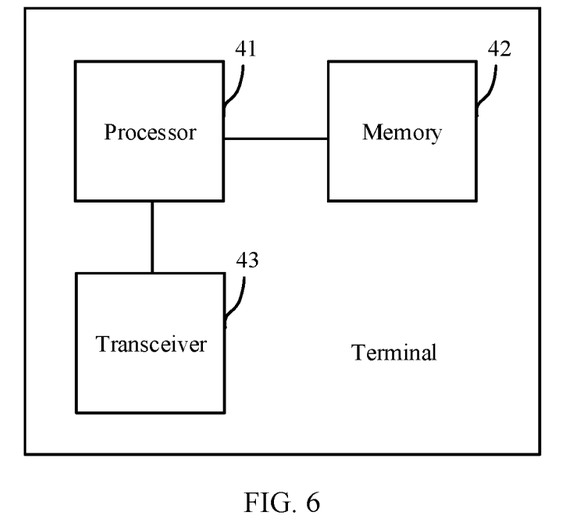
FIG. 6 is a schematic diagram of a terminal according to an embodiment of this application.

FIG. 6 is a schematic diagram of a terminal according to an embodiment of this application. Referring to FIG. 6, the terminal includes a processor 41, a memory 42, and a transceiver 43. The processor 41, the memory 42, and the transceiver 43 communicate with each other by using an internal connection path. The memory 42 is configured to store an instruction. The processor 41 is configured to execute the instruction stored in the memory 42, to control the transceiver 43 to receive a signal and send a signal, and when the processor 41 executes the instruction stored in the memory 42, the processor 41 performs the steps of the transmit end in the method shown in FIG. 2.

What is claimed is:

1. A data packet retransmission method, carried out by a radio link control (RLC) entity of a transmit end, the method comprising:
   sending a target sequence number and a first data packet to a medium access control (MAC) entity of the transmit end, wherein the RLC entity of the transmit end is in an unacknowledged mode, and wherein the target sequence number is a sequence number of the first data packet;
   recording a quantity of times that the target sequence number is transmitted to the MAC entity of the transmit end at an RLC layer;
   obtaining, in accordance with the RLC entity of the transmit end receiving the target sequence number and a negative acknowledgement that are sent by the MAC entity of the transmit end, the RLC layer transmission count corresponding to the target sequence number; and
   sending, in accordance with the RLC entity of the transmit end determining that the RLC layer transmission count is less than an RLC layer transmission threshold, a retransmission instruction based on the first data packet to the MAC entity of the transmit end.

2. The data packet retransmission method according to claim 1, wherein before the sending a target sequence number and a first data packet to a medium access control MAC entity of the transmit end, the method further comprises:
   storing a mapping relationship between the target sequence number and the first data packet in a cache area.

3. The data packet retransmission method according to claim 2, wherein before the sending a retransmission instruction based on the first data packet to the MAC entity of the transmit end, the method further comprises:
   obtaining the first data packet that corresponds to the target sequence number and that is in the cache area, and
   generating, based on the first data packet and the target sequence number, the retransmission instruction based on the first data packet; or
   obtaining the first data packet that corresponds to the target sequence number and that is in the cache area, and generating, based on the first data packet in the cache area, the retransmission instruction based on the first data packet.

4. The data packet retransmission method according to claim 2, wherein after the recording a quantity of times that the target sequence number is transmitted to the MAC entity of the transmit end at an RLC layer, the method further comprises:
   deleting, in accordance with the RLC entity of the transmit end receiving the target sequence number and an acknowledgement that are sent by the MAC entity of the transmit end, the mapping relationship between the target sequence number and the first data packet from the cache area.

5. The data packet retransmission method according to claim 2, wherein after the obtaining the RLC layer transmission count corresponding to the target sequence number, the method further comprises:
   deleting, in accordance with the RLC entity of the transmit end determining that the RLC layer transmission count is greater than the RLC layer transmission threshold, the mapping relationship between the target sequence number and the first data packet from the cache area.

6. The data packet retransmission method according to claim 1, wherein before the sending a retransmission instruction based on the first data packet to the MAC entity of the transmit end, the method further comprises:
   generating, based on the target sequence number and a retransmission identifier, the retransmission instruction based on the first data packet, wherein the retransmission identifier is used to indicate to the MAC entity of the transmit end to retransmit the first data packet corresponding to the target sequence number.

7. The data packet retransmission method according to claim 6, wherein after the recording a quantity of times that the target sequence number is transmitted to the MAC entity of the transmit end at an RLC layer, the method further comprises:
  sending, in accordance with the RLC entity of the transmit end receiving the target sequence number and an acknowledgement that are sent by the MAC entity of the transmit end, a discarding instruction based on the first data packet to the MAC entity of the transmit end,
  wherein the discarding instruction comprises the target sequence number and a discarding identifier, and
  wherein the discarding identifier is used to indicate to the MAC entity of the transmit end to delete a mapping relationship between the target sequence number and the first data packet.

8. The data packet retransmission method according to claim 6, wherein after the obtaining, by the RLC entity of the transmit end, the RLC layer transmission count corresponding to the target sequence number, the method further comprises:
  sending, in accordance with the RLC entity of the transmit end determining that the RLC layer transmission count is greater than the RLC layer transmission threshold, sending, by the RLC entity of the transmit end, a discarding instruction based on the first data packet to the MAC entity of the transmit end,
  wherein the discarding instruction comprises the target sequence number and a discarding identifier, and
  wherein the discarding identifier is used to indicate to the MAC entity of the transmit end to delete a mapping relationship between the target sequence number and the first data packet.

9. A data packet retransmission method carried out by a medium access control (MAC) entity of a transmit end, the method comprising:
  receiving a target sequence number and a first data packet that are sent by a radio link control (RLC) entity of the transmit end, wherein the RLC entity of the transmit end is in an unacknowledged mode, and the target sequence number is a sequence number of the first data packet;
  generating a second data packet based on the first data packet;
  sending the second data packet to a MAC entity of a receive end;
  sending, in accordance with a quantity of negative acknowledgements that is received by the MAC entity of the transmit end, that is sent by the MAC entity of the receive end, and that is based on the second data packet, being greater than a MAC layer transmission threshold, the target sequence number and the negative acknowledgement to the RLC entity of the transmit end; and
  triggering, in accordance with the MAC entity of the transmit end receiving a retransmission instruction that is sent by the RLC entity of the transmit end and that is based on the first data packet, a transmission process based on the second data packet.

10. The data packet retransmission method according to claim 9, wherein after the receiving a target sequence number and a first data packet that are sent by an RLC entity of the transmit end, the method further comprises:
  storing a mapping relationship between the target sequence number and the first data packet in a cache area.

11. The data packet retransmission method according to claim 10, wherein the triggering a transmission process based on the second data packet comprises:
  obtaining the target sequence number and a retransmission identifier that are in the retransmission instruction, wherein the retransmission identifier is used to indicate to the MAC entity of the transmit end to retransmit the first data packet corresponding to the target sequence number;
  obtaining the first data packet that corresponds to the target sequence number and that is in the cache area;
  generating the second data packet based on the first data packet; and
  sending the second data packet to the MAC entity of the receive end.

12. The data packet retransmission method according to claim 10, wherein after the sending the target sequence number and the negative acknowledgement to the RLC entity of the transmit end, the method further comprises:
  deleting, in accordance with the MAC entity of the transmit end receiving a discarding instruction that is sent by the RLC entity of the transmit end and that is based on the first data packet, the mapping relationship between the target sequence number and the first data packet from the cache area,
  wherein the discarding instruction comprises the target sequence number and a discarding identifier, and
  wherein the discarding identifier is used to indicate to the MAC entity of the transmit end to delete the mapping relationship between the target sequence number and the first data packet from the cache area.

13. The data packet retransmission method according to claim 10, wherein after the sending the second data packet to a MAC entity of a receive end, the method further comprises:
  sending, in accordance with the MAC entity of the transmit end receiving an acknowledgement that is sent by the MAC entity of the receive end and that is based on the second data packet, the target sequence number and the acknowledgement to the RLC entity of the transmit end, and deleting the mapping relationship between the target sequence number and the first data packet from the cache area.

14. The data packet retransmission method according to claim 9, wherein the triggering a transmission process based on the second data packet comprises:
  obtaining the first data packet in the retransmission instruction;
  generating the second data packet based on the first data packet; and
  sending the second data packet to the MAC entity of the receive end.

15. The data packet retransmission method according to claim 14, wherein after the sending the second data packet to the MAC entity of the receive end, the method further comprises:
  sending, in accordance with the MAC entity of the transmit end receiving an acknowledgement that is sent by the MAC entity of the receive end and that is based on the second data packet, the target sequence number and the acknowledgement to the RLC entity of the transmit end.

16. A radio link control (RLC) entity of a transmit end data packet retransmission apparatus comprising:
  a processor; and
  a non-transitory computer-readable medium including computer-executable instructions that, when executed by the processor, cause the data packet transmission apparatus to carry out a method comprising:

sending a target sequence number and a first data packet to a medium access control (MAC) entity of the transmit end, wherein the RLC entity of the transmit end is in an unacknowledged mode, and wherein the target sequence number is a sequence number of the first data packet;

recording a quantity of times that the target sequence number is transmitted to the MAC entity of the transmit end at an RLC layer;

obtaining, in accordance with the RLC entity of the transmit end receiving the target sequence number and a negative acknowledgement that are sent by the MAC entity of the transmit end, the RLC layer transmission count corresponding to the target sequence number; and sending, in accordance with the RLC entity of the transmit end determining that the RLC layer transmission count is less than an RLC layer transmission threshold, a retransmission instruction based on the first data packet to the MAC entity of the transmit end.

17. The data packet retransmission apparatus according to claim 16, wherein the method further comprises:

storing a mapping relationship between the target sequence number and the first data packet in a cache area.

18. The data packet retransmission apparatus according to claim 17, wherein the method further comprises:

obtaining the first data packet that corresponds to the target sequence number and that is in the cache area, and generating, based on the first data packet and the target sequence number, the retransmission instruction based on the first data packet; or obtaining the first data packet that corresponds to the target sequence number and that is in the cache area, and generating, based on the first data packet in the cache area, the retransmission instruction based on the first data packet.

19. The data packet retransmission apparatus according to claim 17, wherein the method further comprises:

deleting, in accordance with the RLC entity of the transmit end receiving the target sequence number and an acknowledgement that are sent by the MAC entity of the transmit end, the mapping relationship between the target sequence number and the first data packet from the cache area.

20. The data packet retransmission apparatus according to claim 17, wherein the method further comprises:

deleting, in accordance with the RLC entity of the transmit end determining that the RLC layer transmission count is greater than the RLC layer transmission threshold, the mapping relationship between the target sequence number and the first data packet from the cache area.

* * * * *